United States Patent
Wu et al.

(10) Patent No.: US 11,711,106 B2
(45) Date of Patent: Jul. 25, 2023

(54) MULTI-CHANNEL RECEIVER AND MULTI-CHANNEL RECEPTION METHOD

(71) Applicant: Montage LZ Technologies (Chengdu) Co., Ltd., Chengdu (CN)

(72) Inventors: Shunfang Wu, Chengdu (CN); Mingfu Shi, Chengdu (CN); Jun Xu, Chengdu (CN); Shawn Si, Chengdu (CN)

(73) Assignee: Montage LZ Technologies (Chengdu) Co., Ltd., Sichuan (CN)

(*) Notice: Subject to any disclaimer, the term of this patent is extended or adjusted under 35 U.S.C. 154(b) by 0 days.

(21) Appl. No.: 17/522,923

(22) Filed: Nov. 10, 2021

(65) Prior Publication Data
US 2022/0149877 A1    May 12, 2022

(30) Foreign Application Priority Data

Nov. 10, 2020  (CN) .......................... 202011249456.3
Nov. 12, 2020  (CN) .......................... 202011260149.5

(51) Int. Cl.
*H04B 1/16*  (2006.01)
(52) U.S. Cl.
CPC ...................................... *H04B 1/16* (2013.01)
(58) Field of Classification Search
CPC ........ H04B 1/005; H04B 1/0067; H04B 1/06; H04B 1/10; H04B 1/16; H04B 1/1638; H04D 1/0075; H03D 7/16
See application file for complete search history.

(56) References Cited

U.S. PATENT DOCUMENTS

| 2020/0195282 A1* | 6/2020 | Lax | .......................... H04B 1/26 |
| 2022/0069852 A1* | 3/2022 | Harada | ................ H04B 1/0092 |

* cited by examiner

Primary Examiner — Long Nguyen (57) ABSTRACT

The present disclosure provides multi-channel receiver and multi-channel reception method. The method includes: amplifying an input RF signal and outputting differential RF signals; mixing multi-phase local oscillator signals with the received differential RF signals to generate differential multi-phase intermediate frequency signals; configuring weight coefficients for the differential multi-phase intermediate frequency signals; configuring the weight coefficients to be positive or negative according to a channel for reception corresponding to a harmonic of any order of the local oscillator signals; superimposing the signals processed by the weight coefficient configuration and the positive/negative configuration of the weights to simultaneously select an intermediate frequency signal downconverted by a harmonic of any order of the local oscillator signals and suppress intermediate frequency signals downconverted by harmonics of the other orders of the local oscillator signals; and receiving, by a channel reception module corresponding to each channel, a selected intermediate frequency signal correspondingly thereto respectively.

16 Claims, 9 Drawing Sheets

MULTI-CHANNEL RECEIVER AND MULTI-CHANNEL RECEPTION METHOD

CROSS REFERENCE TO RELATED APPLICATIONS

The present disclosure claims the benefit of priority to Chinese Patent Application No. CN 2020112494563, entitled "Multi-Channel Receiver Architecture and Reception Method", filed with CNIPA on Nov. 10, 2020, and Chinese Patent Application No. CN 2020112601495, entitled "Multi-Channel Receiver Architecture and Reception Method", filed with CNIPA on Nov. 12, 2020, the disclosures of which are incorporated herein by reference in their entirety for all purposes.

FIELD OF TECHNOLOGY

The present disclosure generally relates to the field of receiver design, in particular, to a multi-channel receiver and a multi-channel reception method.

BACKGROUND

A multi-channel receiver is a receiver capable of simultaneous reception of multiple signals. Conventional multi-channel receivers usually use the following methods to achieve simultaneous multi-channel reception.

Figure 1A:
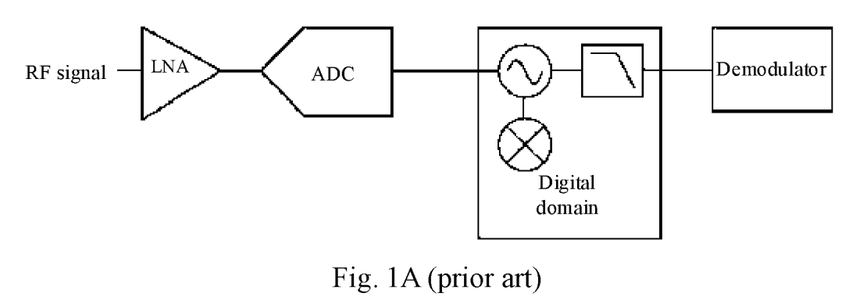
FIGS. 1A to 1D shows schematic diagrams of simultaneous multi-channel reception implemented by multi-channel receivers in the prior art.

In a first method, as shown in FIG. 1A, received radio frequency (RF) signals are amplified by a low-noise amplifier (LNA) and then sent to an analog-to-digital converter (ADC); the ADC converts the amplified RF signals into digital signals; and then in a digital domain, desired channel signals are subject to frequency mixing and filtering as needed and transmitted to a demodulator for demodulation. In this way, the ADC needs to sample all signals in an entire frequency band, and to prevent signal aliasing, the sampling frequency of the ADC should be higher than twice the highest RF frequency, which means that the ADC operates at a high frequency during the whole process, that the system's power consumption is relatively high, and that the system's overall efficiency will be relatively low if the number of channels needed is relatively small.

Figure 1B:
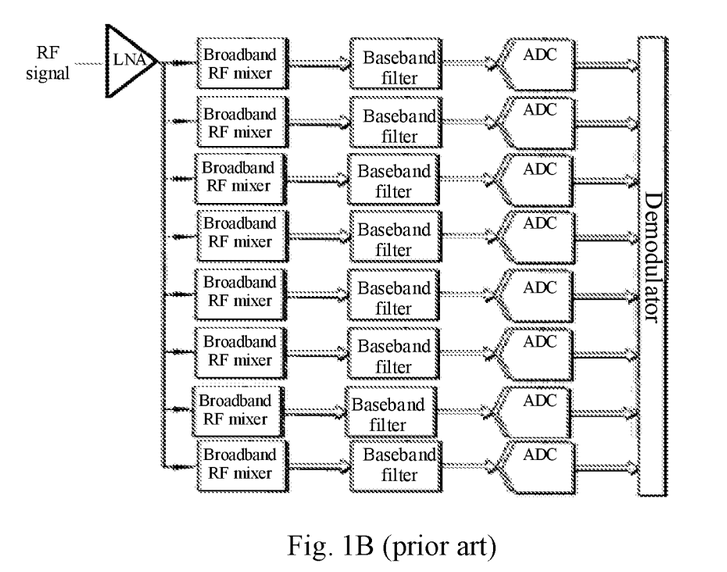

In a second method, as shown in FIG. 1B, a plurality of broadband RF mixers are used to downconvert RF signals of desired channels into intermediate frequency signals, which are then processed by ADCs and transmitted to a demodulator for demodulation. In this way, due to the use of multiple groups of broadband RF mixers to achieve frequency mixing of RF signals of different frequencies to obtain multiple groups of intermediate frequency signals, when only one channel is used for reception, the power efficiency is the same as in a conventional tuner, but once multiple channels are used for reception, multiple local oscillators with different frequencies may interfere with each other, resulting in reduced reception quality. Moreover, the multiple local oscillators need multiple frequency synthesizers, which increase the power consumption and require more chip area.

Figure 1C:
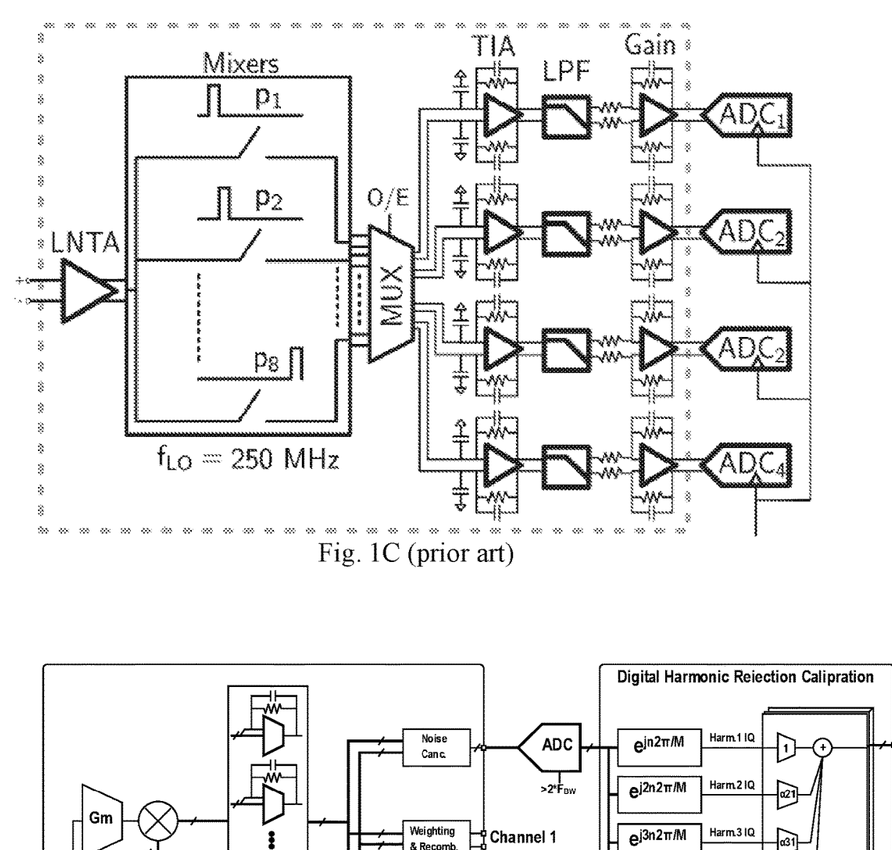

In a third method, as shown in FIG. 1C, using a frequency division method, RF signals corresponding to harmonics of various orders of local oscillator signals are mixed with multi-phase local oscillator signals by multi-phase mixers into intermediate frequency signals, which are then processed by a multiplexer (MUX) to output harmonic signals of various orders, which enter trans-impedance amplifiers (TIAs), low pass filters (LPFs) and gain modules successively for amplification, filtering and gaining, and are then converted into digital signals by ADCs, and then weighting and recombination are performed on the multi-phase digital signals in a digital domain to select desired channels and filter out undesired channels (i.e., harmonic rejection). As the harmonic rejection is accomplished in the digital domain, mismatches between gains and phases in the path from the mixers through the LPFs to the ADCs negatively impact the performance of harmonic rejection in the digital signals, so complex calibrations are required to improve harmonic rejection. Moreover, the signals processed by the filters and the ADCs include harmonic signals of various orders, so a relatively large dynamic range of the circuit is required. In addition, as odd-order and even-order harmonics are not in the same phase, the signals corresponding to the odd-order and even-order harmonics of the local oscillator signals cannot be received at the same time in this method, which limits its application in the field of digital televisions, i.e., reception of any two channels at the same time is not available.

Figure 1D:
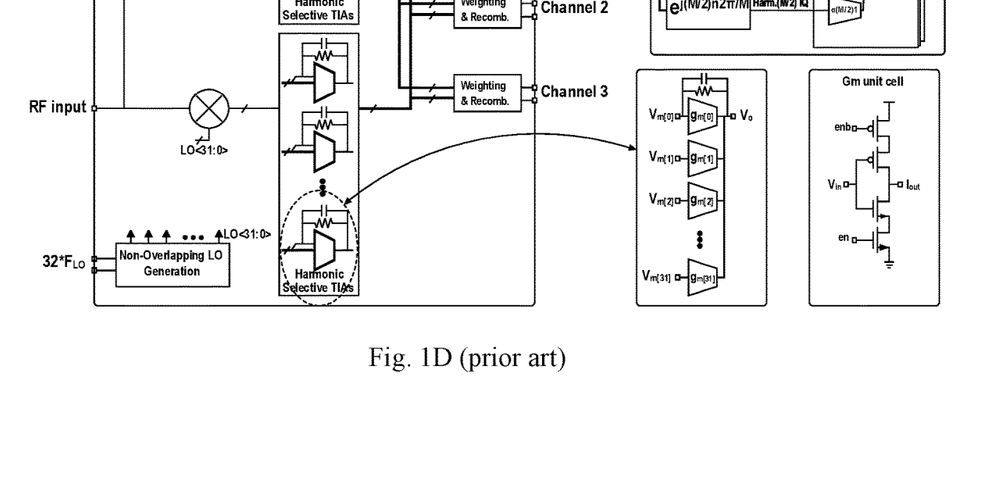

In a fourth method, as shown in FIG. 1D, a multi-phase mixer is used to mix full-band RF signals into intermediate frequency signals, then the intermediate frequency signals of different phases output from the mixer are superimposed to select desired channels, and digital calibration is performed to improve the performance of harmonic rejection. In this way, two single-ended circuits may be used for noise cancellation to obtain an improved noise figure of the corresponding reception link, but this kind of single-ended implementation tends to cause variations of second order intermodulation distortion resulted from different process temperatures, thus affecting linear performance. Even if a differential circuit is used to achieve noise cancellation, there is still a problem where signals corresponding to odd-order and even-order harmonics of the local oscillator signals cannot be received at the same time. A plurality of harmonic selective transconductance amplifiers (harmonic selective TIAs) are used to convert the multi-phase signals generated by the mixer into a voltage, and outputs from the transconductance amplifiers are superimposed to select desired harmonic signals. However, in this method, the harmonic selective TIAs already suppress other harmonic signals during harmonic selection, and only the selected harmonic signals are retained in the signals output therefrom, so a post-stage circuit cannot receive channel signals on other harmonics at the same time. Moreover, although the use of harmonic selective TIAs suppresses harmonic interference, the corresponding input impedance becomes larger, resulting in larger input voltage swings at the TIAs and mixer, since the TIAs no longer have corresponding feedback, thus reducing the linearity of the TIAs and mixer.

Therefore, it has become an urgent technical problem facing those skilled in the art to provide a multi-channel receiver and a multi-channel reception method, to solve the problem in the prior art that channels on a plurality of different harmonics cannot be received at the same time without mutual interference.

SUMMARY

The present disclosure provides a multi-channel receiver, including: a LNA, a mixer, a buffer module, a plurality of frequency selection modules, and a plurality of channel reception modules, wherein the LNA is configured to amplify an input RF signal and output differential RF signals; the mixer is configured to receive the differential RF signals and mix multi-phase local oscillator signals with the received differential RF signals to generate differential multi-phase intermediate frequency signals; the buffer module includes a plurality of buffer units configured to receive and process the differential multi-phase intermediate frequency signals; the frequency selection modules each include a weight configuration module, a switch selection module, and a combination module, wherein the weight configuration module includes a plurality of weight coefficient configuration units corresponding to the multi-phase local oscillator, wherein each weight coefficient configuration unit configures weight coefficients for the differential multi-phase intermediate frequency signals processed by the buffer units; the switch selection module is configured to switch between positive/negative configurations of weight coefficients according to a channel signal to be received corresponding to a harmonic of any order of the local oscillator signals, to control the weight coefficients to be positive or negative; and the combination module comprises a plurality of combination units, each combination unit superimposing the signals subject to the weight coefficient configuration and the positive/negative configuration of the weights, to simultaneously select an intermediate frequency signal downconverted by a harmonic of any order of the local oscillator signals and suppress intermediate frequency signals downconverted by harmonics of other orders of the local oscillator signals; and the plurality of channel reception modules are correspondingly connected to the plurality of frequency selection modules and are respectively configured to receive the intermediate frequency signals selected by the corresponding frequency selection modules.

In an embodiment of the present disclosure, inputs of the channel reception module include an in-phase positive input, an in-phase negative input, a quadrature positive input and a quadrature negative input, respectively; and the combination units combine the weight coefficient configuration units, the positive/negative configuration switches corresponding to the weight coefficient configuration units, and the in-phase positive input, the in-phase negative input, the quadrature positive input, and the quadrature negative input in the channel reception module corresponding to the combination units, respectively, to achieve superimposition of the signals subjected to the weight coefficient configuration and the positive/negative configuration of the weights, and simultaneously select an intermediate frequency signal downconverted by a harmonic of any order of the local oscillator signals and suppress intermediate frequency signals downconverted by harmonics of the other orders of the local oscillator signals.

In an embodiment of the present disclosure, each of the weight coefficient configuration units includes a first weight configuration unit and a second weight configuration unit.

In an embodiment of the present disclosure, the first weight configuration unit is communicated with the in-phase positive input or the in-phase negative input through a positive/negative configuration switch to obtain a positive or negative weight coefficient, and the second weight configuration unit is communicated with the quadrature positive input or the quadrature negative input through a positive/negative configuration switch to obtain a positive or negative weight coefficient. In an embodiment of the present disclosure, the first weight configuration unit and the second weight configuration unit each include current mirrors and perform weight coefficient configuration by configuring the number of the current mirrors respectively.

In an embodiment of the present disclosure, the first weight configuration unit and the second weight configuration unit each include resistors and perform weight coefficient configuration by configuring resistance values of the resistors respectively.

In an embodiment of the present disclosure, the combination unit connects selected intermediate frequency signals that require negative weighting coefficients with the in-phase negative input, connects selected intermediate frequency signals that require positive weighting coefficients with the in-phase positive input, connects quadrature intermediate frequency signals that require positive weighting coefficients with the quadrature positive input, and connects quadrature intermediate frequency signals that require negative weighting coefficients with the quadrature negative input. Intermediate frequency signals of different phases either require a negative weighting coefficient or a negative weighting coefficient depending on the order of their corresponding harmonic of the local oscillator signals.

In an embodiment of the present disclosure, the differential multi-phase intermediate frequency signals are generated from mixing the multi-phase local oscillator signals with RF signals by mixer. And intermediate frequency signals of each phase comprise intermediate frequency signals generated from mixing harmonics of various orders of the multi-phase local oscillator signals with RF signals.

To achieve the above-mentioned and other related objects, the present disclosure provides a multi-channel reception method, including: amplifying an input RF signal and outputting differential RF signals; mixing multi-phase local oscillator signals with the received differential RF signals to generate differential multi-phase intermediate frequency signals; configuring weight coefficients for the differential multi-phase intermediate frequency signals; configuring the weight coefficients to be positive or negative according to a channel for reception corresponding to a harmonic of any order of the local oscillator signals; superimposing signals processed by the weight coefficient configuration and the positive/negative configuration of the weights so that each of a plurality of combination units, independent of other combination units, selects an intermediate frequency signal downconverted by a harmonic of any order of the local oscillator signals and suppress intermediate frequency signals downconverted by harmonics of the other orders of the local oscillator signals; and for each channel, receiving by a channel reception module corresponding to the channel independent of channel reception modules corresponding to other channels, a selected intermediate frequency signal corresponding to the channel reception module.

In an embodiment of the present disclosure, inputs of the channel reception module comprise an in-phase positive input, an in-phase negative input, a quadrature positive input, and a quadrature negative input, respectively; and the step of superimposing signals processed by the weight coefficient configuration and the positive/negative configuration of the weights so that each of a plurality of combination units, independent of other combination units, selects an intermediate frequency signal downconverted by a harmonic of any order of the local oscillator signals and suppress intermediate frequency signals downconverted by harmonics of the other orders of the local oscillator signals includes: combining the intermediate frequency signals corresponding to the multi-phase local oscillator signals with the in-phase positive input, the in-phase negative input, the quadrature positive input, and the quadrature negative input in the corresponding channel reception module by means of positive/negative configuration switches.

In an embodiment of the present disclosure, weight coefficients of intermediate frequency signals of each phase in the multi-phase intermediate frequency signals are configured by a first weight configuration unit and a second weight configuration unit, respectively.

In an embodiment of the present disclosure, the first weight configuration unit is communicated with the in-phase positive input or the in-phase negative input through a positive/negative configuration switch to obtain a positive or negative weight coefficient, and the second weight configuration unit is communicated with the quadrature positive input or the quadrature negative input through a positive/negative configuration switch to obtain a positive or negative weight coefficient.

In an embodiment of the present disclosure, the first weight configuration unit and the second weight configuration unit each perform weight coefficient configuration by configuring the number of current mirrors respectively.

In an embodiment of the present disclosure, the first weight configuration unit and the second weight configuration unit each perform weight coefficient configuration by configuring resistance values of resistors.

In an embodiment of the present application, the combination unit connects selected intermediate frequency signals that require negative weighting coefficients with the in-phase negative input, connects selected intermediate frequency signals that require positive weighting coefficients with the in-phase positive input, connects quadrature intermediate frequency signals that require positive weighting coefficients with the quadrature positive input, and connects quadrature intermediate frequency signals that require negative weighting coefficients with the quadrature negative input. the different phase Intermediate frequency signals of different phases either require a negative weighting coefficient or a negative weighting coefficient depending on the order of their corresponding harmonic of the local oscillator signals.

In an embodiment of the present disclosure, differential multiple-phase intermediate frequency signals are generated from mixing the multi-phase local oscillator signals and RF signal, and intermediate frequency signals of each phase include intermediate frequency signals generated from mixing harmonics of various orders of the multi-phase local oscillator signals with RF signals.

As described above, in the multi-channel receiver and multi-channel reception method of the present disclosure, the differential multi-phase intermediate frequency signals are superimposed and recombined after weight coefficient configuration to select an intermediate frequency signal downconverted by a harmonic of any order of the local oscillator signals and suppress intermediate frequency signals downconverted by harmonics of the other orders of the local oscillator signals; then, according to positive/negative weight coefficients corresponding to the phases corresponding to the selected intermediate frequency signal, the weight coefficients are controlled by switches to be positive or negative; and the weight coefficients of the intermediate frequency signals of each phase, and the switches and the inputs of each channel are combined, so that the receiver can receive a channel signal corresponding to a harmonic of any order of the local oscillator signals or simultaneously receive signals of multiple channels corresponding to harmonics of different orders of the local oscillator signals without mutual interference, thus effectively solving the problem in the prior art that multi-channel signals cannot be received at the same time without mutual interference.

DETAILED DESCRIPTION

Embodiments of the present disclosure will be described below with specific examples, and other advantages and effects of the present disclosure will be readily apparent to those skilled in the art from the disclosure in the specification. The present disclosure may be carried out or applied in other different specific embodiments, and various modifications or changes may also be made to the details of the specification based on different ideas and applications without departing from the spirit of the present disclosure. It is to be noted that the following embodiments and features in the specification may be combined with each other if no conflict will result.

It is to be noted that drawings provided in the following embodiments only schematically illustrate the basic idea of the present disclosure, so the drawings only show components related to the present disclosure, and are not drawn according to the numbers, shapes and sizes of the components in actual implementation; the forms, numbers and proportions of the components in actual implementation may represent an arbitrary variant; and the layout of the components may be more complex.

To solve the problem in the prior art that multi-channel signals cannot be received at the same time without mutual interference. The present disclosure provides a multi-channel receiver and a multi-channel reception method, capable of receiving signals at any frequency in channels with a maximum frequency of $(N/2-1)*f_{lo}$ (where $f_{lo}$ is a fundamental frequency of multi-phase local oscillator signals, and N is the number of phases of multi-phase local oscillator signals), and performing frequency mixing with differential RF signals by using a multi-phase mixer to generate multi-phase intermediate frequency signals, and then performing weighting and superimposition of the generated multi-phase intermediate frequency signals to select channels on RF signals at different harmonic frequencies of local oscillator signals, so that multi-channel signals can be simultaneously received without mutual interference.

Principles and implementations of the multi-channel receiver and the multi-channel reception method of this embodiment will be described in detail below so that a person skilled in the art can understand the multi-channel receiver and the multi-channel reception method of the present invention without creative work.

Figure 2:
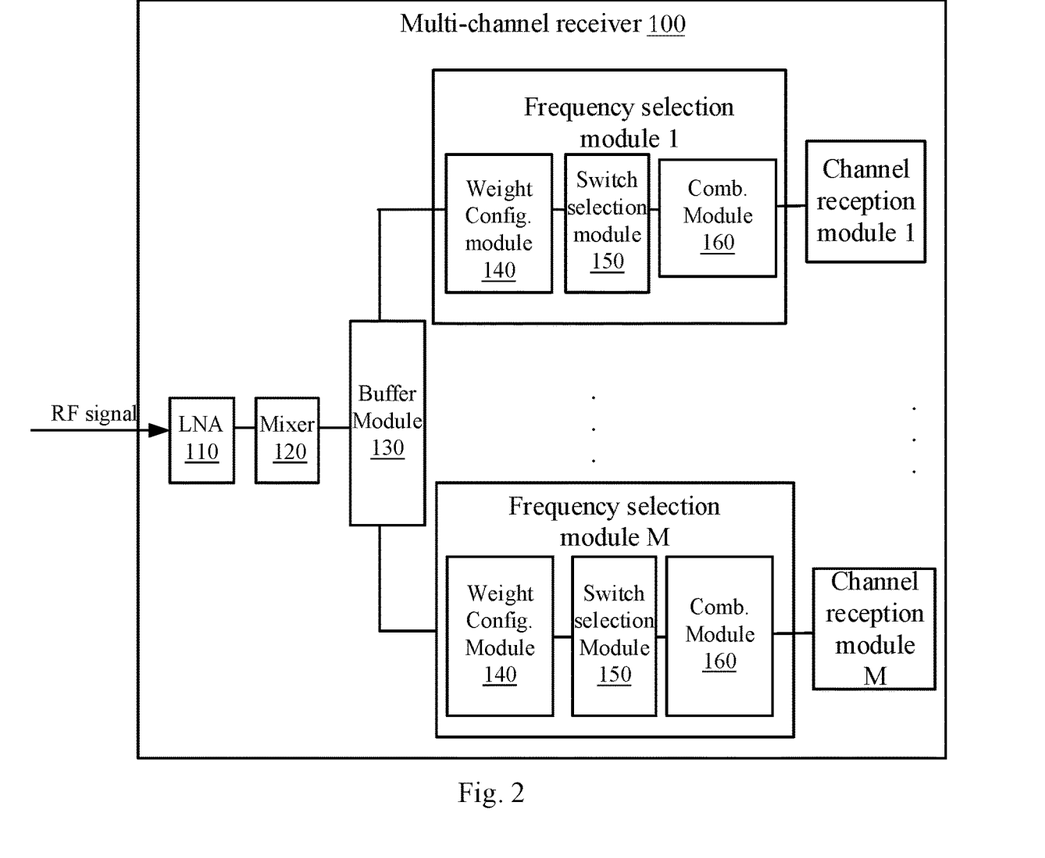
FIG. 2 shows a schematic diagram of a multi-channel receiver in an embodiment of the present disclosure.

FIG. 2 shows a schematic structural diagram of a multi-channel receiver 100 in an embodiment. As shown in FIG. 2, the multi-channel receiver 100 includes: a LNA (LNA) 110, a mixer 120, a buffer module 130, a plurality of frequency selection modules (frequency selection modules 1 to M shown in FIG. 2), and a plurality of channel reception modules (channel reception modules 1 to M shown in FIG. 2).

The LNA 110, the mixer 120, the buffer module 130, the plurality of frequency selection modules, and the plurality of channel reception modules in this embodiment are described specifically below.

In this embodiment, the LNA 110 is configured to amplify an input RF signal and output differential RF signals.

Figure 3:
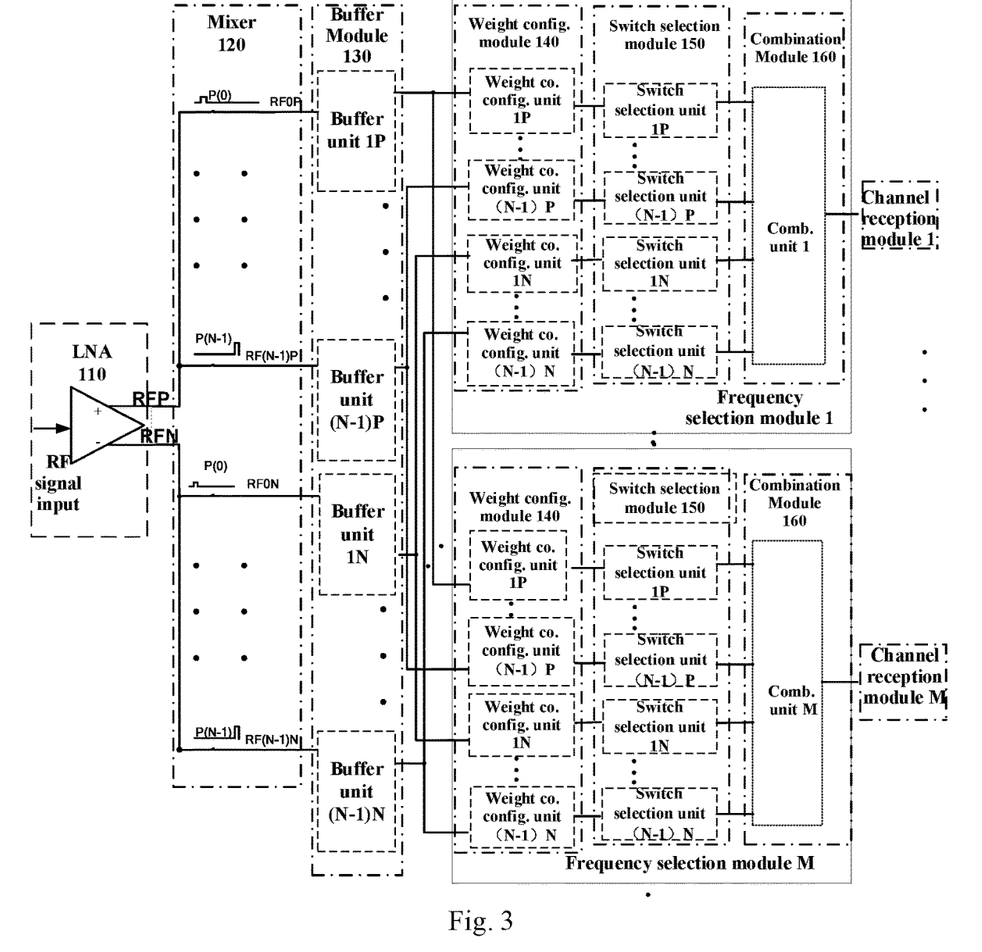
FIG. 3 shows a block diagram of a multi-channel receiver in an embodiment of the present disclosure.

FIG. 3 shows a block diagram of a multi-channel receiver 100 in an embodiment of the present disclosure. In this embodiment, as shown in FIG. 3, the LNA 110 is, but is not limited to, a low noise transconductance amplifier (LNTA), the LNA receiving an RF signal and outputting differential radio frequency current signals RFP and RFN; the differential RF signals RFP and RFN are two paths of RF signals with the same amplitude and opposite phases, wherein RFP is a positive phase signal of the differential RF signals, and RFN is a negative phase signal of the differential RF signals.

In this embodiment, the mixer 120 is configured to receive the differential RF signals RFP and RFN and mix multi-phase local oscillator signals with the received differential RF signals to generate differential multi-phase intermediate frequency signals.

When generating the differential multi-phase intermediate frequency signals by the mixer 120, the multi-phase local oscillator signals and the RF signals are mixed to generate the multi-phase intermediate frequency signals, and the local oscillator signal of each phase is composed of harmonics of various orders. So harmonics of various orders of the local oscillator signals of each phase are mixed with corresponding RF signals to obtain intermediate frequency signals. That is, intermediate frequency signals of each phase include intermediate frequency signals downconverted by harmonics of various orders of the local oscillator signals of a corresponding phase, so the frequency selection module needs to select an intermediate frequency signal downconverted by a harmonic of a desired order of the local oscillator signals and suppress intermediate frequency signals downconverted by harmonics of the other orders of the local oscillator signals. The frequency selection module can receive any signal in a channel with a maximum frequency of $(N/2-1)*f_{lo}$, where $f_{lo}$ is a fundamental frequency of the multi-phase local oscillator signals, and N is the number of phases of the multi-phase local oscillator signals.

Figure 4:
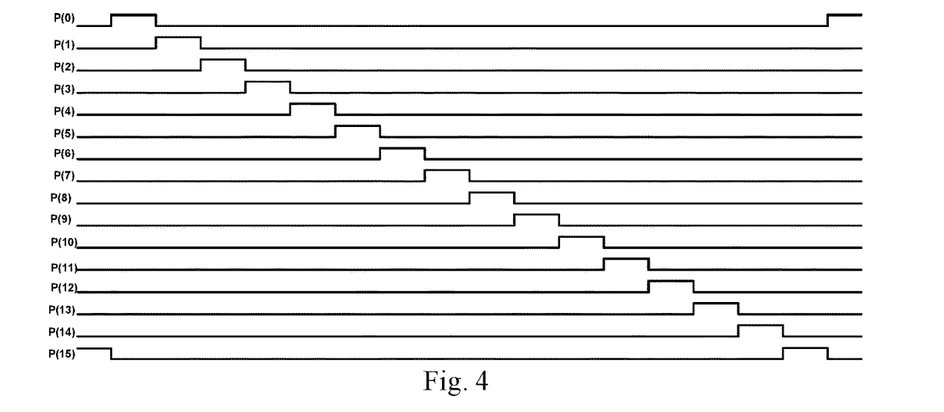
FIG. 4 shows a timing diagram of multi-phase local oscillator signals used in a multi-channel receiver in an embodiment of the present disclosure.

Specifically, as shown in FIG. 3, the mixer 120 performs frequency mixing on the differential RF signals RFP and RFN, wherein RFP is mixed with the multi-phase local oscillator signals P(0), . . . , P(N/2), . . . , and P(N−1) (as shown in FIG. 4, which shows a timing diagram of the multi-phase local oscillator signals used in the mixer 120 of this embodiment) to generate intermediate frequency signals RF0P, . . . , RF(N/2)P, . . . , and RF(N−1)P, and RFN is mixed with the multi-phase local oscillator signals P (0), P (N/2), . . . , and P (N−1) to generate intermediate frequency signals RF0N, . . . , RF (N/2) N, . . . , and RF(N−1)N, wherein N is an integer.

In this embodiment, the structure of the mixer 120 and the method of generating the differential multi-phase intermediate frequency signals are not limited, and any mixer 120 that can generate the differential multi-phase intermediate frequency signals required in this embodiment is applicable to the present invention.

In this embodiment, one method for generating the differential multi-phase intermediate frequency signals by the mixer 120 is as follows.

The mixer 120 first generates desired multi-phase clock pulse signals based on the received differential RF signals, and then based on the multi-phase clock pulse signals, converts the frequency of the differential RF signals to an intermediate frequency under the control of multi-phase strobe signals Pi to generate differential multi-phase intermediate frequency signals, wherein in the multi-phase strobe signals Pi, i=0, 1, . . . , and N−1, and there are a total of N multi-phase strobe signals.

For the differential RF signals RFP and RFN output from the LNA 110, the mixer 120 converts the RF signals to intermediate frequency signals under the control of the multi-phase clock pulse signals.

For example, when N=16, under the control of P0, P1, . . . , and P15, the positive-phase RF signal RFP is subject to frequency mixing to generate multi-phase intermediate frequency signals RF0P, RF1P, . . . , RF14P, and RF15P.

Similarly, the negative-phase RF signal RFN is subject to frequency mixing to generate multi-phase intermediate frequency signals RF0N, RF1N, . . . , and RF15N.

After the mixer 120 generates the differential multi-phase intermediate frequency signals, the signals are processed by the buffer module 130 and then enter the frequency selection modules.

In this embodiment, the buffer module 130 includes a plurality of buffer units configured to receive and process the differential multi-phase intermediate frequency signals. Each buffer unit may be a trans-impedance amplifier (TIA) or a common-gate amplifier.

The differential multi-phase intermediate frequency signals processed by the buffer units enter the corresponding frequency selection modules.

In this embodiment, the multi-channel receiver 100 includes a plurality of frequency selection modules: frequency selection module 1, . . . , and frequency selection module M, wherein the frequency selection module 1, . . . , and frequency selection module M are in one-to-one correspondence with channel reception module 1, . . . , and channel reception module M, and each frequency selection module correspondingly selects an intermediate frequency signal needed for the corresponding channel reception module.

Specifically, in this embodiment, each frequency selection module includes a weight configuration module 140, a switch selection module 150, and a combination module 160.

Figure 5:
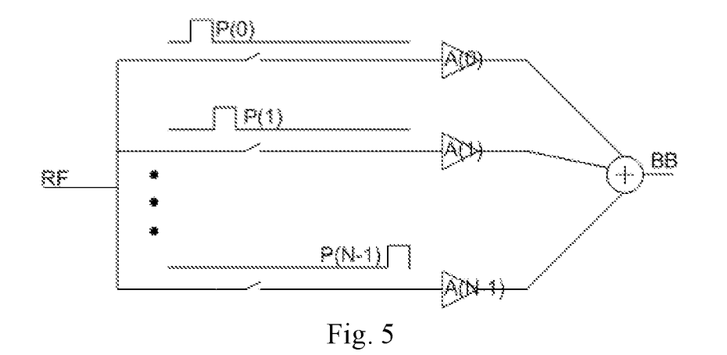
FIG. 5 shows a schematic diagram of selecting harmonics of local oscillator signals by subjecting multi-phase local oscillator signals to frequency mixing and weighting intermediate frequency signals.

A schematic diagram of achieve local oscillator harmonic selection by frequency mixing using a multi-phase local oscillator signal and weighting intermediate frequency signals is shown in FIG. 5 with the intermediate frequency signals as an example. The frequency selection module selects an intermediate frequency signal downconverted by a harmonic of any order of the local oscillator signals and suppresses intermediate frequency signals downconverted by harmonics of the other orders of the local oscillator signals, wherein as shown in FIG. 5, the selected intermediate frequency signal is obtained by weighted summation of the multi-phase intermediate frequency signals generated by mixing the multi-phase local oscillator signals P(0), P(1) . . . , and P(N−1) with the signal RF, by using weight coefficients A(0), A(1) . . . , and A(N−1) configured by weight coefficient configuration units.

Figure 6A:
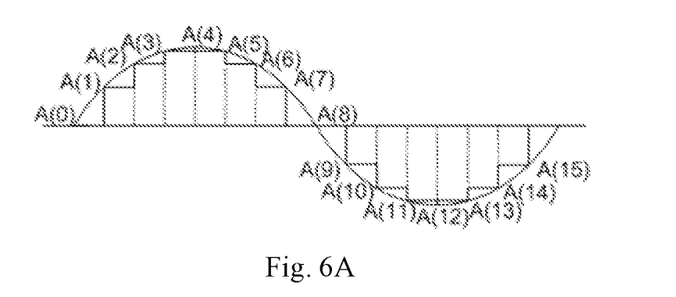
FIGS. 6A to 6C respectively show schematic diagrams of first-, second- and fifth-order harmonics of local oscillator signals obtained equivalently by configuring different weight coefficients for different phases.
Figure 6B:
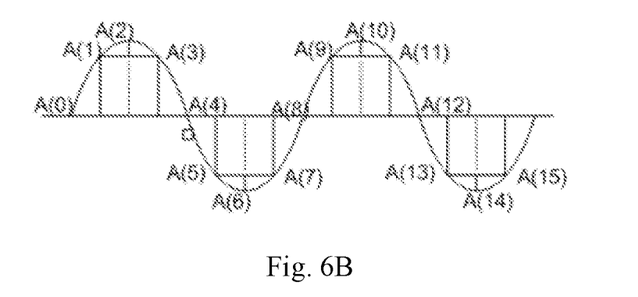
Figure 6C:
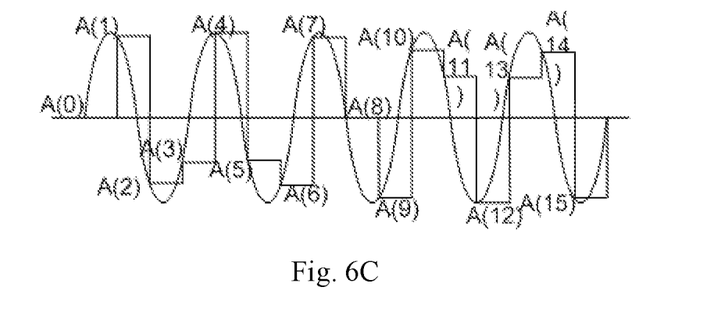

Using N=16 as an example, by configuring different weight coefficients A(0), A(1), . . . , and A(N−1) for the multi-phase intermediate frequency signals generated from the multi-phase local oscillator signals P(0), P(1), . . . , and P(N−1), an intermediate frequency signal downconverted by a harmonic of any order of the local oscillators can be obtained. FIGS. 6A to 6C show schematic diagrams of first-order, second-order and fifth-order harmonics obtained equivalently by applying weight coefficients to different phases, respectively. As shown in FIGS. 6A to 6C, when $$A(k) = G * \mathrm{Sin}\left(\frac{2*\pi*k}{N}\right),$$

the effective harmonic is the harmonic of the first order, intermediate frequency signals downconverted by the harmonic of the first order of the local oscillator signals are formed by-summation of the weighted multi-phase intermediate frequency signals generated by frequency mixing, with the weight coefficients being A(0), A(1) . . . , and A(N−1); when $$A(k) = G * \mathrm{Sin}\left(\frac{2*\pi*k*2}{N}\right),$$

the effective local oscillator harmonic is the second harmonic (harmonic of the second order), and intermediate frequency signals corresponding to the second harmonic of the local oscillator signals are formed by summation of the weighted intermediate frequency signals generated from the multi-phase local oscillator signals P(0), P(1), . . . , and P(N−1) by frequency mixing, with the weight coefficients being A(0), A(1) . . . , and A(N−1); and when $$A(k) = G * \mathrm{Sin}\left(\frac{2*\pi*k*5}{N}\right),$$

the effective local oscillator harmonic is the fifth harmonic (harmonic of the fifth order), and intermediate frequency signals corresponding to the fifth harmonic of the local oscillator signals are formed by summation of the weighted intermediate frequency signals generated from the multi-phase local oscillator signals P(0), P(1), . . . , and P(N−1) by frequency mixing, with the weight coefficients being A(0), A(1) . . . , and A(N−1), wherein k=0, 1, 2, . . . , and N−1; and G is the maximum magnitude.

As shown in FIG. 3, the weight configuration module 140 includes a plurality of weight coefficient configuration units corresponding to the multi-phase local oscillator signals: weight coefficient configuration unit 1P, . . . , and weight coefficient configuration unit (N−1)P for weight coefficient configuration on positive-phase intermediate frequency signals RF0P, . . . , and RF(N−1)P; and weight coefficient configuration unit 1N, . . . , and weight coefficient configuration unit (N−1)N for weight coefficient configuration on negative-phase intermediate frequency signals RF0N, . . . , and RF(N−1)N. Each weight coefficient configuration unit is configured to perform weight coefficient configuration on a differential multi-phase intermediate frequency signal processed by a buffer unit; and the switch selection module 150 is configured to switch between positive/negative configurations of weight coefficients according to a channel signal to be received corresponding to a harmonic of any order of the local oscillator signals, to control the weight coefficients to be positive or negative.

Further, each of the weight coefficient configuration units includes a first weight configuration unit 141 and a second weight configuration unit 142. The first weight configuration unit 141 and the second weight configuration unit 142 are respectively configured to adjust amplitude coefficients (i.e., weight coefficients) of received intermediate frequency signals of each phase.

Figure 7:
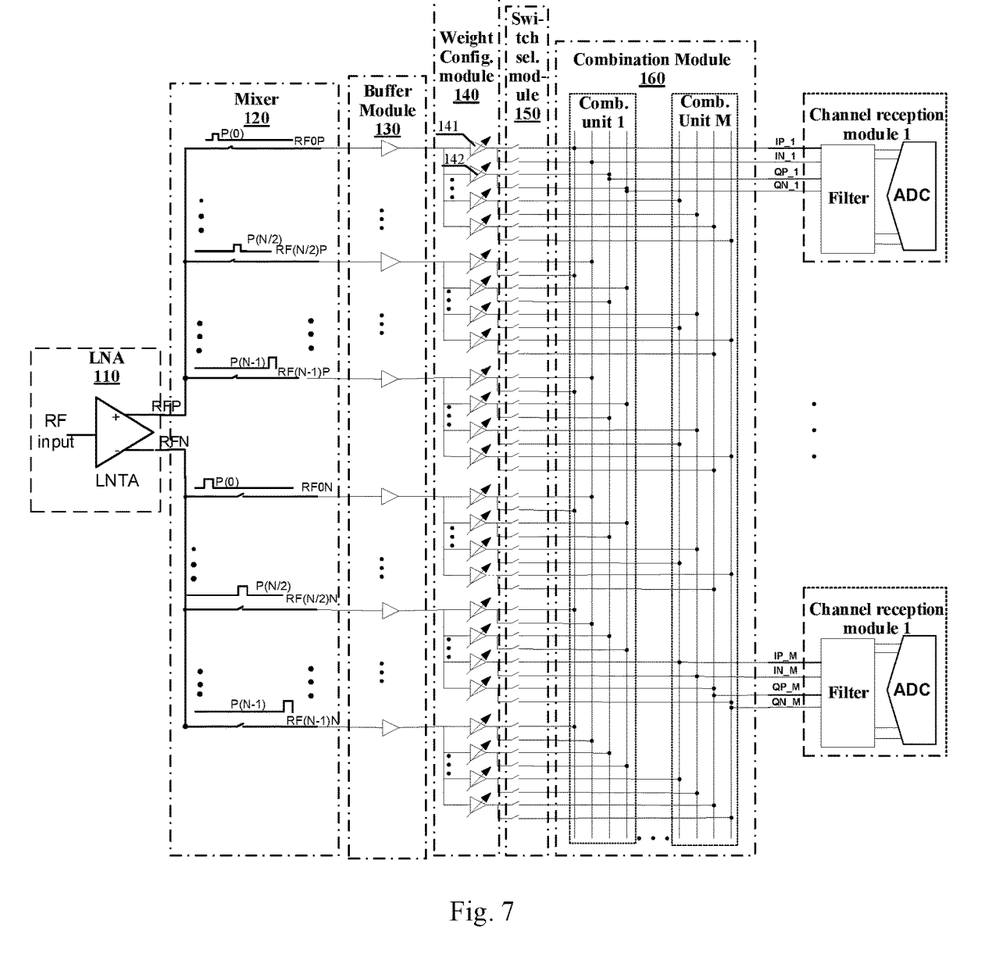
FIG. 7 shows a schematic structural diagram of a multi-channel receiver in an embodiment of the present disclosure.

FIG. 7 shows a schematic structural diagram of a multi-channel receiver 100 in an embodiment of the present disclosure. Specifically, in this embodiment, as shown in FIG. 7, inputs of the channel reception modules include an in-phase positive input IP, an in-phase negative input IN, a quadrature positive input QP and a quadrature negative input QN, respectively, wherein the in-phase positive input IP, the in-phase negative input IN, the quadrature positive input QP and the quadrature negative input QN are four paths of signals in succession with the same clock period but with a phase difference of ¼ harmonic clock period from each other. For example, inputs of the channel reception module 1 include an in-phase positive input IP_1, an in-phase negative input IN_1, a quadrature positive input QP_1, and a quadrature negative input QN_1.

In this embodiment, the first weight configuration unit 141 is communicated with the in-phase positive input IP or the in-phase negative input IN through a positive/negative configuration switch to obtain a positive or negative weight coefficient, and the second weight configuration unit 142 is communicated with the quadrature positive input QP or the quadrature negative input QN through a positive/negative configuration switch to obtain a positive or negative weight coefficient.

Figure 8:
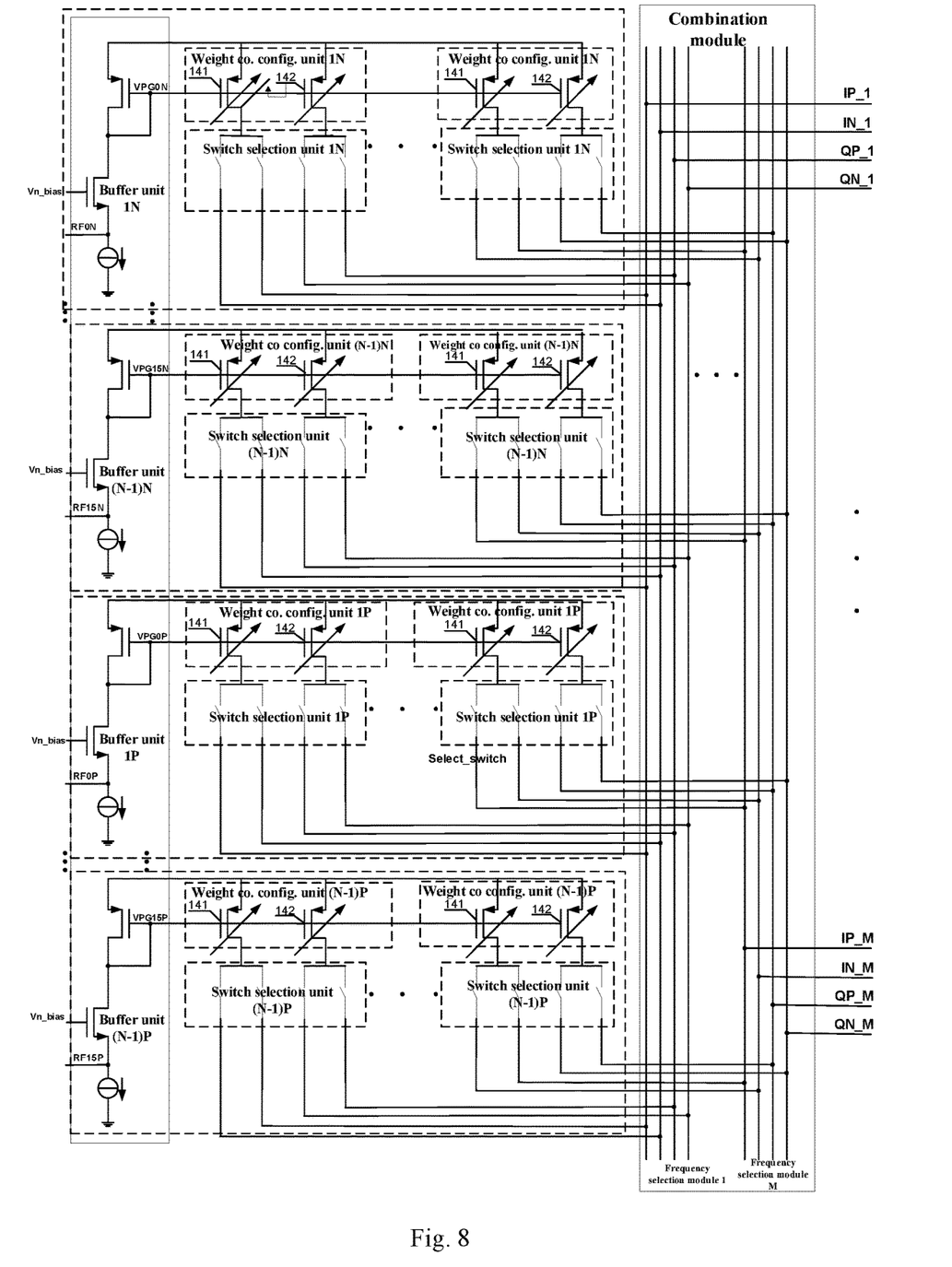
FIG. 8 shows a schematic structural diagram of weight coefficient configuration using current mirrors in a multi-channel receiver in an embodiment of the present disclosure.

In this embodiment, as shown in FIGS. 7 and 8, the first weight configuration unit 141 and the second weight configuration unit 142 each include current mirrors and perform weight coefficient configuration by configuring the number of the current mirrors respectively.

Figure 9:
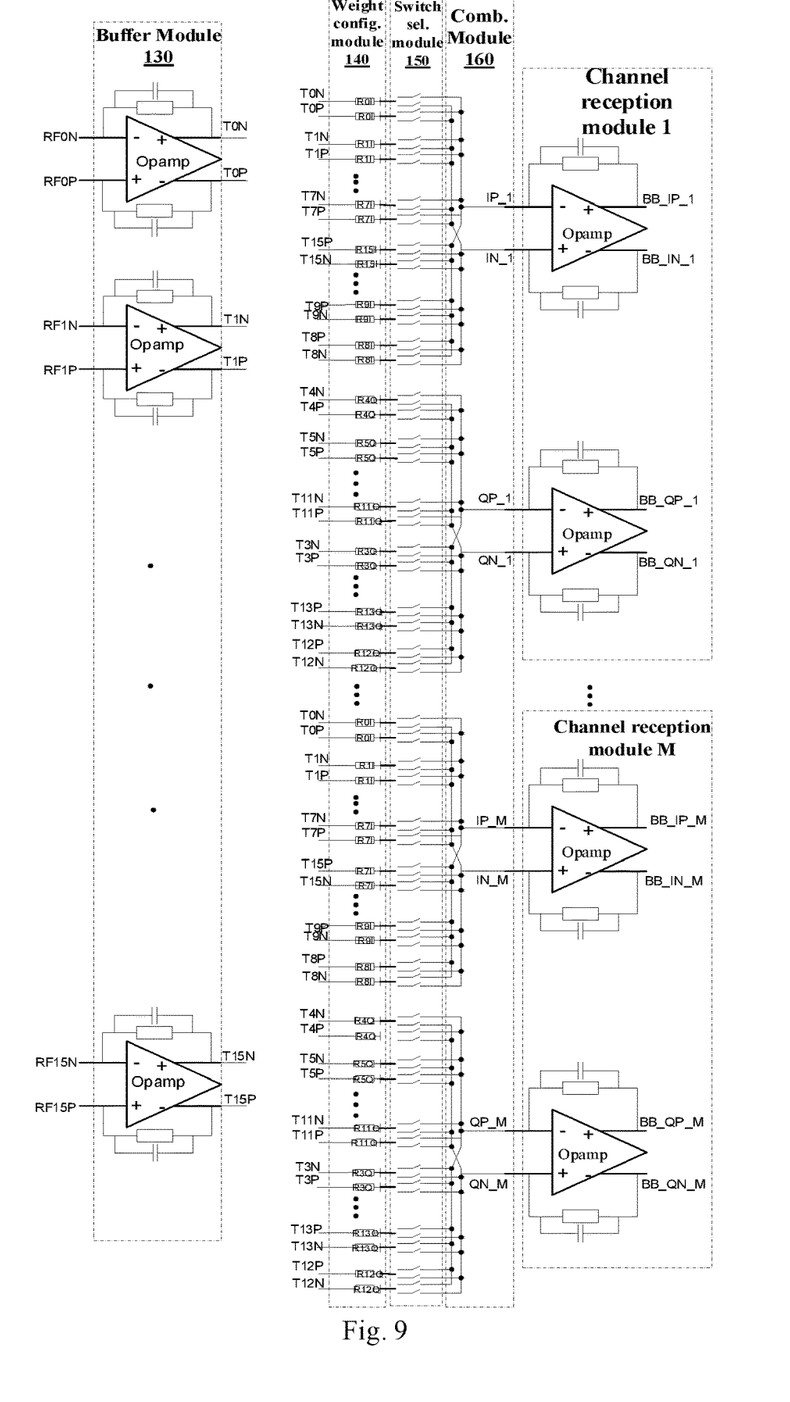
FIG. 9 shows a schematic structural diagram of weight coefficient configuration using resistors in a multi-channel receiver in an embodiment of the present disclosure.

Further, in other embodiments, as shown in FIG. 9, the first weight configuration unit 141 and the second weight configuration unit 142 each include resistors and perform weight coefficient configuration by configuring resistance values of the resistors respectively.

In this embodiment, the switch selection module 150 is configured to switch between positive/negative configurations of weight coefficients according to a channel signal to be received corresponding to a harmonic of any order of the local oscillator signals, to control the weight coefficients to be positive or negative.

When signals corresponding to harmonics of different orders of the local oscillator signals are received, there are positive and negative weight coefficients for corresponding signals of the same phase. In this embodiment, the positive/negative configuration switches are connected to the in-phase positive input and the in-phase negative input to obtain the positive and negative coefficients of the signals. That is, the switch selection module 150 achieves the positive/negative configuration of the weight coefficients through the positive/negative configuration switches according to positive/negative values as required of the weight coefficients corresponding to selected intermediate frequency signals.

In this embodiment, using N=16 as an example, in the case of an even-order harmonic (e.g. a second harmonic of FIG. 6B), the absolute values of the weight coefficients A(i) and A(i+N/2) are equal, but the weight coefficients are same numbers, and in this case, according to the positive/negative values as required of the weight coefficients, the switch selection module 150 controls communication with the corresponding inputs of the corresponding channel reception module to achieve positive/negative configuration of the weight coefficients, that is, to control the signs of the weight coefficients A(i) and A(i+N/2) to be positive or negative, thereby avoiding signals of the same sign canceling each other out, so that harmonics of odd and even orders can be received at the same time by channels.

In this embodiment, as shown in FIG. 7, the switch selection module 150 includes a plurality of positive/negative configuration switches, and one of the first weight configuration units 141 in weight configuration module 140 is controlled, by two positive/negative configuration switches, to be communicated with the in-phase positive input IP or the in-phase negative input IN so that each weight coefficient has a positive or negative value as needed.

The combination module 160 includes a plurality of combination units, wherein each combination unit superimposes signals processed by weight coefficient configuration and positive/negative configuration of the weights, to simultaneously select an intermediate frequency signal downconverted by a harmonic of any order of the local oscillator signals and suppress intermediate frequency signals downconverted by harmonics of the other orders of the local oscillator signals.

Specifically, each combination unit combines weight coefficient configuration units, the positive/negative configuration switches corresponding to the weight coefficient configuration units, and the in-phase positive input IP, the in-phase negative input IN, the quadrature positive input QP, and the quadrature negative input QN in the channel reception module corresponding to the combination unit, respectively, to achieve superimposition of the signals processed by the weight coefficient configuration and the positive/negative configuration of the weights, and simultaneously select an intermediate frequency signal downconverted by a harmonic of any order of the local oscillator signals and suppress intermediate frequency signals downconverted by harmonics of the other orders of the local oscillator signals, and inputs a channel signal of the corresponding order formed by the combination to the corresponding channel reception module.

In other words, in this embodiment, the selecting process of the selection module is as follows: selecting a weight configuration unit from each set of weight coefficient configuration units to determine the weight coefficients corresponding to the intermediate frequency signals of each phase, superimposing and recombining the differential multi-phase intermediate frequency signals after weight coefficient configuration to select from the intermediate frequency signals downconverted by a harmonic of any order of the local oscillator signals and suppress the other intermediate frequency signals downconverted by harmonics of the other orders of the local oscillator signals, thereby determining a corresponding output channel of the selected intermediate frequency signal, and then, based on the parity of the order of the harmonic corresponding to the selected intermediate frequency signal, controlling which input of the channel is connected to the switch correspondingly connected with the weight configuration unit, thereby controlling the weight coefficients to have a positive or negative value.

Specifically, the combination unit connects selected intermediate frequency signals that require negative weighting coefficients with the in-phase negative input IN, connects selected intermediate frequency signals that require positive weighting coefficients with the in-phase positive input IP, connects quadrature intermediate frequency signals that require positive weighting coefficients with the quadrature positive input QP, and connects quadrature intermediate frequency signals that require negative weighting coefficients with the quadrature negative input QN. Intermediate frequency signals of different phases either require a negative weighting coefficient or a negative weighting coefficient depending on the order of their corresponding harmonic of the local oscillator signals.

As shown in FIG. 6A, for example, N=16, and when the order of harmonic of the local oscillator signals corresponding to the selected intermediate frequency signal is of the first order, the values of weight coefficients A(1) and A(9) are opposite; positive/negative configuration switches corresponding to the phase P(1) and the phase P(9) of the multi-phase local oscillator signals are respectively connected to the in-phase positive input IP and the in-phase negative input IN of the channel reception module 1; and positive/negative configuration switches corresponding to a phase P(5) orthogonal to the phase P (1), and a phase P(14) orthogonal to the phase P(9) are correspondingly connected to the quadrature positive input QP and the quadrature negative input QN, so that the receiver can receive a channel signal corresponding to a harmonic of the first order of the local oscillator signals.

As shown in FIG. 6B, when the harmonic of the local oscillator signals corresponding to the selected intermediate frequency signal is of the second order, the values of weight coefficients A(1) and A(9) are the same; positive/negative configuration switches corresponding to the phase P(1) and phase P(9) are both connected to the in-phase positive input IP or the in-phase negative input IN of the channel reception module 2; and positive/negative configuration switches corresponding to a phase P(3) orthogonal to the phase P (1), and a phase P(11) orthogonal to the phase P(9) are both connected to the in-phase positive input QP or the in-phase negative input QN, to perform phase inversion of P(9) to make same sign of the phase P(1) and the phase P(9), and perform phase inversion of P(11) to make same sign of the phase P(3) and the phase P(11), so that the receiver can receive a channel signal corresponding to the harmonic of the second order of the local oscillator signals.

In this way, by adopting the positive/negative configuration switches, channel signals corresponding to the harmonics of odd orders of the local oscillator signals and channel signals corresponding to the harmonics of odd orders of the local oscillator signals can be controlled to be input into the input channel reception module, so that the receiver can receive a channel signal of any order or receive channel signals of different orders at the same time without mutual interference.

Embodiment 2

Figure 10:
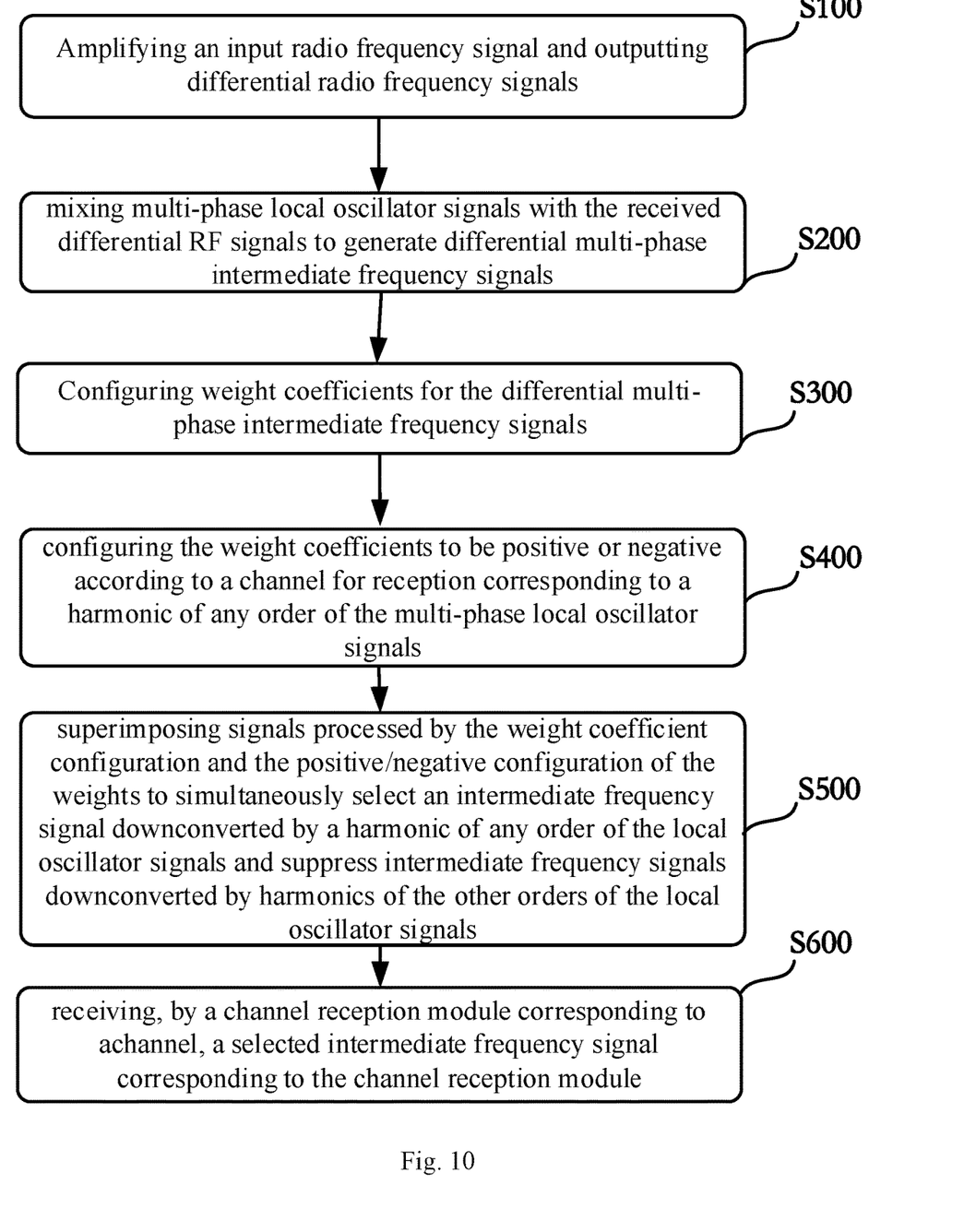
FIG. 10 is a flowchart showing a multi-channel reception method in an embodiment of the present disclosure.

As shown in FIG. 10, this embodiment further provides a multi-channel reception method, the method including:

step S100, amplifying an input RF signal and outputting differential RF signals;

step S200, mixing multi-phase local oscillator signals with the received differential RF signals to generate differential multi-phase intermediate frequency signals;

step S300, configuring weight coefficients for the differential multi-phase intermediate frequency signals;

step S400, configuring the weight coefficients to be positive or negative according to a channel for reception corresponding to a harmonic of any order of the local oscillator;

step S500, superimposing signals processed by the weight coefficient configuration and the positive/negative configuration of the weights so that each of a plurality of combination units, independent of other combination units, selects an intermediate frequency signal downconverted by a harmonic of any order of the local oscillator signals and suppress intermediate frequency signals downconverted by harmonics of the other orders of the local oscillator signals; and step S600, for each channel, receiving by a channel reception module corresponding to the channel independent of channel reception modules corresponding to other channels, a selected intermediate frequency signal corresponding to the channel reception module.

The above steps S100 to S600 in the multi-channel reception method of this embodiment are further described below.

Step S100, amplifying an input RF signal and outputting differential RF signals.

Step S100 is implemented by a LNA such as a LNTA.

The LNA receives a RF signal from a RF signal source and outputs differential radio frequency current signals RFP and RFN; the differential RF signals RFP and RFN are two RF signals with the same amplitudes and opposite phases, wherein RFP is a RF signal with a positive phase, and RFN is a RF signal with a negative phase.

Step S200, mixing multi-phase local oscillator signals with the received differential RF signals to generate differential multi-phase intermediate frequency signals.

The differential multi-phase intermediate frequency signals are generated from mixing the multi-phase local oscillator signals and RF signals. The local oscillator signal of each phase is composed of harmonics of various orders. So harmonics of various orders of the local oscillator signal of each phase are mixed with corresponding RF signals to obtain intermediate frequency signals. That is, the intermediate frequency signals of each phase comprise intermediate frequency signals downconverted by harmonics of various orders of the multi-phase local oscillator signals. So the frequency selection module needs to select an intermediate frequency signal downconverted by a harmonic of a desired order of the local oscillator signals and suppress intermediate frequency signals downconverted by harmonics of the other orders of the local oscillator signals.

The above step S200 is implemented by a mixer 120. The principle of implementation is the same as that described for the mixer 120 in Embodiment 1.

step S300, configuring weight coefficients for the differential multi-phase intermediate frequency signals.

In this embodiment, weight coefficients of the intermediate frequency signals of each phase in the multi-phase intermediate frequency signals are configured by a first weight configuration unit 141 and a second weight configuration unit 142, respectively.

The first weight configuration unit 141 and the second weight configuration unit 142 each perform weight coefficient configuration by configuring the number of current mirrors respectively.

Inputs of the channel reception module include an in-phase positive input IP, an in-phase negative input IN, a quadrature positive input QP, and a quadrature negative input QN, respectively, wherein the in-phase positive input IP, the quadrature positive input QP, the in-phase negative input IN and the quadrature negative input QN are four paths of signals in succession with the same clock period but with a phase difference of ¼ harmonic clock period from each other. The first weight configuration unit 141 is communicated with the in-phase positive input IP or the in-phase negative input IN through a positive/negative configuration switch to obtain a positive or negative weight coefficient, and the second weight configuration unit 142 is communicated with the quadrature positive input QP or the quadrature negative input QN through a positive/negative configuration switch to obtain a positive or negative weight coefficient.

The above step S300 is implemented by a weight configuration module 140 structure as shown in FIG. 3, 7, 8 or 9. The principle of implementation is similar to that described for the weight configuration module 140 in Embodiment 1.

Step S400, configuring the weight coefficients to be positive or negative according to a channel for reception corresponding to a harmonic of any order of the local oscillator signals.

The above step S400 is implemented by a switch selection module 150 as shown in FIG. 3, 7, 8 or 9.

Step S500, the step of superimposing signals processed by the weight coefficient configuration and the positive/negative configuration of the weights so that each of a plurality of combination units, independent of other combination units, selects an intermediate frequency signal downconverted by a harmonic of any order of the local oscillator signals and suppress intermediate frequency signals downconverted by harmonics of the other orders of the local oscillator signals.

In this embodiment, when the order of the harmonic corresponding to the selected intermediate frequency signal is of a first predetermined order, first phase signals with opposite weight coefficients are connected to the in-phase positive input IP and the in-phase negative input IN, respectively, and corresponding phase signals quadrature to (i.e. orthogonal to, that is, with a 90-degree phase shift from) the first phase signals are connected to the quadrature positive input QP and the quadrature negative input QN, respectively; and when the order of the harmonic corresponding to the selected intermediate frequency signal is of a second predetermined order, second phase signals with the same weight coefficient are connected to the in-phase positive input IP or the in-phase negative input IN, and phase signals quadrature to (orthogonal to) the second phase signals are connected to the quadrature positive input QP or the quadrature negative input QN.

The above step S500 is implemented by a combination module 160 in FIG. 3, 7, 8 or 9.

Step S600, receiving, by a channel reception module corresponding to each channel, a selected intermediate frequency signal corresponding thereto respectively.

The above step S600 is implemented by a channel reception module in FIG. 3, 7, 8 or 9.

The implementation principle of the multi-channel reception method in this embodiment is substantially the same as that of the multi-channel receiver 100.

It is to be noted that the circuit structure and principle used to implement the multi-channel reception method of the present disclosure are not limited to the structures shown in FIGS. 2 to 9, and all reasonable variations made by a person skilled in the art based on the ideas of the present disclosure shall be considered as within the scope of the present disclosure.

In summary, in the multi-channel receiver and multi-channel reception method of the present disclosure, the differential multi-phase intermediate frequency signals are superimposed and recombined after weight coefficient configuration to select an intermediate frequency signal downconverted by a harmonic of any order of the local oscillator signals and suppress the other intermediate frequency signals downconverted by the harmonics of the other orders of the local oscillator signals; then, according to positive/negative weight coefficients corresponding to the order of harmonic corresponding to the selected intermediate frequency signal, the weight coefficients are controlled by switches to be positive or negative; and the weight coefficients of the intermediate frequency signals of each phase, the switches, and the inputs of each channel are combined, so that the receiver can receive a channel signal corresponding to any order of the local oscillator signals or simultaneously receive channel signals corresponding to a plurality of different orders of the local oscillator signals without mutual interference, thus effectively overcoming shortcomings in the prior art.

The above embodiments are merely illustrative of the principles of the present disclosure and effects thereof, and are not intended to limit the present disclosure. Any person skilled in the art can modify or change the above embodiments without departing from the spirit and scope of the present disclosure. Therefore, all equivalent modifications or changes made by those skilled in the art without departing from the spirit and technical ideas disclosed in the present disclosure are still encompassed within the scope of the claims of the present disclosure.

What is claimed is:

1. A multi-channel receiver, comprising: a low-noise amplifier (LNA), a mixer, a buffer module, a plurality of frequency selection modules, and a plurality of channel reception modules, wherein
   the LNA is configured to amplify an input radio frequency (RF) signal and output differential RF signals;
   the mixer is configured to receive the differential RF signals and mix multi-phase local oscillator signals with the received differential RF signals to generate differential multi-phase intermediate frequency signals;
   the buffer module comprises a plurality of buffer units configured to receive and process the differential multi-phase intermediate frequency signals;
   the frequency selection modules each comprise a weight configuration module, a switch selection module, and a combination module, wherein
      the weight configuration module comprises a plurality of weight coefficient configuration units corresponding to the multi-phase local oscillator signals, wherein each weight coefficient configuration unit performs weight coefficient numerical value configuration for the differential multi-phase intermediate frequency signals processed by the buffer units;
      the switch selection module comprises positive/negative configuration switches and is configured to perform positive/negative configuration on signals processed by the weight configuration module by turning positive/negative configuration switches of weight coefficients on or off according to a channel signal to be received corresponding to a harmonic of any order of the multi-phase local oscillator signals, to control the weight coefficient to be positive or negative; and
      the combination module comprises a plurality of combination units, wherein each combination unit superimposes signals processed by the switch selection module to simultaneously select a first superimposed intermediate frequency signal downconverted by the harmonic of any order of the multi-phase local oscillator signals and suppress second superimposed intermediate frequency signals downconverted by harmonics of the other orders of the multi-phase local oscillator signals; and
   the plurality of channel reception modules are correspondingly connected to the plurality of frequency selection modules and are respectively configured to receive the first superimposed intermediate frequency signals selected by the frequency selection modules.

2. The multi-channel receiver according to claim 1, wherein inputs of each channel reception module comprise an in-phase positive input, an in-phase negative input, a quadrature positive input, and a quadrature negative input, respectively;
   wherein each combination unit combines the weight coefficient configuration units, the positive/negative configuration switches corresponding to the weight coefficient configuration units, and the in-phase positive input, the in-phase negative input, the quadrature positive input and the quadrature negative input in the channel reception module corresponding to the combination unit, respectively, to superimpose the signals processed by the switch selection module, and simultaneously select the first superimposed intermediate frequency signal and suppress the second superimposed intermediate frequency signals.

3. The multi-channel receiver according to claim 2, wherein each of the weight coefficient configuration units comprises a first weight configuration unit, and a second weight configuration unit.

4. The multi-channel receiver according to claim 3, wherein the first weight configuration unit is communicated with the in-phase positive input or the in-phase negative input through a first positive/negative configuration switch to obtain a first positive or negative weight coefficient, and the second weight configuration unit is communicated with the quadrature positive input or the quadrature negative input through a second positive/negative configuration switch to obtain a second positive or negative weight coefficient.

5. The multi-channel receiver according to claim 3, wherein the first weight configuration unit and the second weight configuration unit each include current mirrors and perform weight coefficient numerical value configuration by configuring the number of the current mirrors respectively.

6. The multi-channel receiver according to claim 3, wherein the first weight configuration unit and the second weight configuration unit each include resistors and perform weight coefficient numerical value configuration by configuring resistance values of the resistors respectively.

7. The multi-channel receiver according to claim 2, wherein
   the first superimposed intermediate frequency signal comprises in-phase positive intermediate frequency signal that requires positive weighting coefficient, in-phase negative intermediate frequency signal that requires negative weighting coefficient, quadrature positive intermediate frequency signal that requires positive weighting coefficient, and quadrature negative intermediate frequency signal that requires negative weighting coefficient;

each combination unit is used to connect the in-phase negative intermediate frequency signals with the in-phase negative input, connect the in-phase positive intermediate frequency signal with the in-phase positive input, connect the quadrature positive intermediate frequency signal with the quadrature positive input, and connect the quadrature negative intermediate frequency signal with the quadrature negative input, wherein the first superimposed intermediate frequency signal of different phases either requires a positive weighting coefficient or a negative weighting coefficient depending on the order of their corresponding harmonic of the multi-phase local oscillator signals.

8. The multi-channel receiver according to claim 1, wherein the differential multi-phase intermediate frequency signals are generated from mixing harmonics of various orders of the multi-phase local oscillator signals with the differential RF signals.

9. A multi-channel reception method, comprising:
S100: amplifying an input RF signal and outputting differential RF signals;
S200: mixing multi-phase local oscillator signals with the received differential RF signals to generate differential multi-phase intermediate frequency signals;
S300: configuring numerical values of weight coefficients for the differential multi-phase intermediate frequency signals;
S400: configuring the weight coefficients to be positive or negative according to a channel for reception corresponding to a harmonic of any order of the multi-phase local oscillator signals;
S500: superimposing signals obtained after the steps S300 and S400 so that each of a plurality of combination units, independent of other combination units, selects a first superimposed intermediate frequency signal downconverted by the harmonic of any order of the multi-phase local oscillator signals and suppress second superimposed intermediate frequency signals downconverted by harmonics of the other orders of the multi-phase local oscillator signals; and
S600: receiving the first superimposed intermediate frequency signal by one of a plurality of channel reception modules.

10. The multi-channel reception method according to claim 9, wherein inputs of each channel reception module comprises an in-phase positive input, an in-phase negative input, a quadrature positive input and a quadrature negative input, respectively; and the step S500 further comprises:

connecting components of the first superimposed intermediate frequency signal with the in-phase positive input, the in-phase negative input, the quadrature positive input, and the quadrature negative input in the corresponding channel reception module by positive/negative configuration switches.

11. The multi-channel reception method according to claim 10, wherein the multi-phase intermediate frequency signals are configured with weight coefficients by a first weight configuration unit and a second weight configuration unit, respectively.

12. The multi-channel reception method according to claim 11, wherein the first weight configuration unit is communicated with the in-phase positive input or the in-phase negative input through a first positive/negative configuration switch to obtain a first positive or negative weight coefficient, and the second weight configuration unit is communicated with the quadrature positive input or the quadrature negative input through a second positive/negative configuration switch to obtain a second positive or negative weight coefficient.

13. The multi-channel reception method according to claim 11, wherein the first weight configuration unit and the second weight configuration unit each perform weight coefficient configuration by configuring the number of current mirrors respectively.

14. The multi-channel reception method according to claim 11, wherein the first weight configuration unit and the second weight configuration unit each perform weight coefficient configuration by configuring resistance values of resistors respectively.

15. The multi-channel reception method according to claim 10, wherein the first superimposed intermediate frequency signal comprises in-phase positive intermediate frequency signal that requires positive weighting coefficient, in-phase negative intermediate frequency signal that requires negative weighting coefficient, quadrature positive intermediate frequency signal that requires positive weighting coefficient, and quadrature negative intermediate frequency signal that requires negative weighting coefficient;

each combination unit is used to connect the in-phase negative intermediate frequency signal with the in-phase negative input, connect the in-phase positive intermediate frequency signal with the in-phase positive input, connect the quadrature positive intermediate frequency signal with the quadrature positive input, and connect the quadrature negative intermediate frequency signal with the quadrature negative input, wherein the superimposed intermediate frequency signals of different phases either require a positive weighting coefficient or a negative weighting coefficient depending on the order of their corresponding harmonic of the multi-phase local oscillator signals.

16. The multi-channel reception method according to claim 9, wherein the differential multi-phase intermediate frequency signals are generated from mixing harmonics of various orders of the multi-phase local oscillator signals with the differential RF signals.

* * * * *